UNITED STATES PATENT OFFICE.

AUGUST SCHILLING, OF SAN FRANCISCO, CALIFORNIA.

ROASTED COFFEE-BERRIES.

SPECIFICATION forming part of Letters Patent No. 312,515, dated February 17, 1885.

Application filed August 14, 1884. (No specimens.)

*To all whom it may concern:*

Be it known that I, AUGUST SCHILLING, a citizen of the United States, residing at San Francisco, in the county of San Francisco and State of California, have invented new and useful Improvements in Roasted Coffee-Berries, of which the following is a specification.

My invention has for its object to fully develop the strength and flavor of the coffee-berry when ground and made into a decoction, and to prevent the absorption of moisture by the berry or the escape of the volatile aromatic principle from the roasted berry before it is disintegrated or ground; and to such ends it consists in providing a coating of an alkaline salt and a resin to the berry, applied during the process of roasting.

In carrying out my invention I take advantage of the two chemical facts that resins are soluble in solutions of alkaline salts, and that the introduction of alkaline salts into coffee brings out the strength and flavor of the decoction made from the ground berry. By making use of these chemical facts in one process I produce an article of commerce possessing desirable properties not hitherto produced.

My method or process of treating the roasted berries I describe as follows:

While the berries are undergoing the process of roasting, during which they are kept in a state of constant agitation, I introduce into the vessel in which the roasting is being carried on a solution composed of a portion of resin dissolved in a solution consisting of an alkaline salt—as, for instance, pearlash or borax dissolved in water. The proportions I find desirable are about two ounces of pearlash, or an equivalent alkaline salt, bicarbonate of soda or borax, to which I then add about five ounces of a suitable resinous material—such as shellac—and when the resin is dissolved the preparation is ready for use. A sufficient quantity of this preparation is then injected or poured into the vessel in which the coffee-berries are exposed, causing the liquid to be distributed throughout the mass. This agitation is kept briskly up until each individual berry has come in contact with the solution, which in the course of a short time, varying with the quantity of berries under treatment, is evaporated, leaving a thin semi-transparent film upon the surface of each berry. This film possesses peculiar properties, inasmuch as it consists of a combination of resin and an alkaline salt, which are conjointly deposited upon the surface of the roasted berry by the evaporation through the heat of the roasting process of the liquid which held them in solution.

If the alkaline salt were precipitated alone upon the surface of the berry in the form of a powder, it might be removed by friction or other causes; but being intimately combined with the resin the tenacious properties of the latter cause it to adhere to the berry and protect it against abrasion.

I am aware that it is not new to coat roasted coffee with a glutinous or gelatinous matter, which serves to retain the aroma of the coffee, and also acts as a clarifying agent when the ground coffee has been boiled in water. In such process the coffee, after it has been roasted and quickly cooled, is treated with a hot gelatinous compound, which is mixed with the coffee by agitation, and is dried or deposited upon the coffee as a hard film by forcing currents of air through the coffee.

My process differs from the above, since I use a coating composition which can be applied to the coffee during the performance of the roasting operation, and is deposited upon the coffee-berries and rendered hard by the action of the heat required to carry out the roasting process, and for this reason my coating process carried on simultaneously with the roasting of the coffee renders the entire process more expeditious and simple, and does not require the use of special or independent apparatus. Moreover, by using a coating compound containing an alkaline salt and resin I form on coffee-berries a film possessing the property of bringing out the strength and flavor of the decoction made from the ground berries.

In the coated coffee above set forth and disclaimed the gelatinous coating is merely used as a clarifying agent, and does not assist in the extraction of the extractive matters of the coffee.

Having thus described my invention, what I claim is—

5. The herein-described product, which consists of roasted coffee-berries coated with a resinous varnish, substantially as described.

In testimony whereof I have hereunto set my hand and seal in the presence of two subscribing witnesses.

AUGUST SCHILLING. [L. S.]

Witnesses:
R. D. MILNE,
J. H. TAGGART.